United States Patent
Haustein et al.

(10) Patent No.: US 8,478,933 B2
(45) Date of Patent: Jul. 2, 2013

(54) SYSTEMS AND METHODS FOR PERFORMING DEDUPLICATED DATA PROCESSING ON TAPE

(75) Inventors: Nils Haustein, Soergenloch (DE); Stefan Neff, Boos (DE); Ulf Troppens, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 12/902,022

(22) Filed: Oct. 11, 2010

(65) Prior Publication Data
US 2011/0125950 A1   May 26, 2011

(30) Foreign Application Priority Data
Nov. 24, 2009   (EP) .................................... 09176818

(51) Int. Cl.
*G06F 12/00*   (2006.01)
(52) U.S. Cl.
USPC ........... 711/111; 711/155; 711/154; 711/218; 711/162; 711/161; 711/E12.001; 711/E12.092; 711/4

(58) Field of Classification Search
USPC .......................... 711/4, 111, E12.01, E12.092
See application file for complete search history.

(56) References Cited

U.S. PATENT DOCUMENTS

| | | | |
|---|---|---|---|
| 2008/0229037 A1 | 9/2008 | Bunte et al. | |
| 2009/0089483 A1* | 4/2009 | Tanaka et al. | 711/103 |
| 2009/0210640 A1 | 8/2009 | Davis | |
| 2010/0082547 A1* | 4/2010 | Mace et al. | 707/648 |

* cited by examiner

*Primary Examiner* — Mardochee Chery
(74) *Attorney, Agent, or Firm* — Griffiths & Seaton PLLC

(57) ABSTRACT

A method, computer management apparatus, and computer program product are provided for processing data stored on a sequential storage media within a computational computing environment. A block reference table and most often read blocks are loaded from a modified tape format of a sequential storage media into an internal memory of a sequential storage media device. During write command processing, a data deduplication procedure is performed using a modified block reference table. It is determined if entries from the block reference table must be deleted and responsive to this identifying and deleting host block and device block entries from the block reference table.

6 Claims, 6 Drawing Sheets

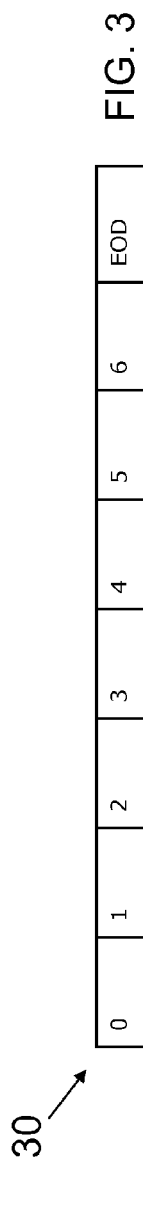
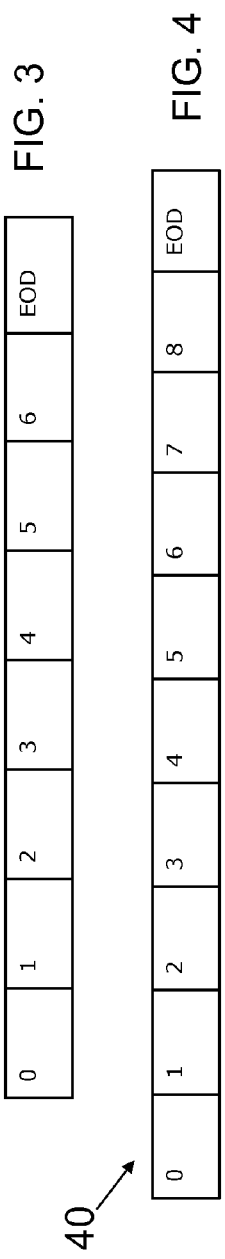
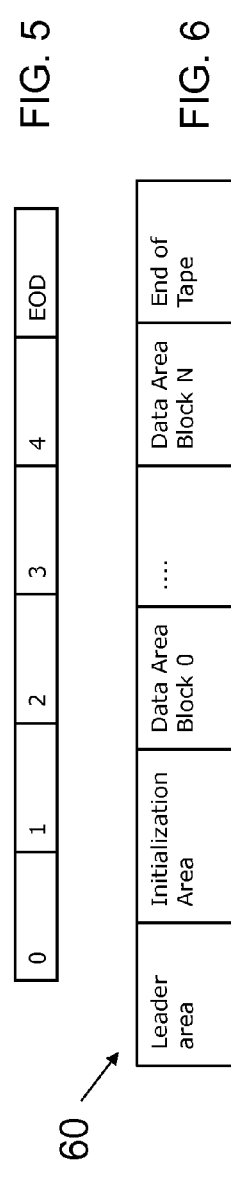
FIG. 3
FIG. 4
FIG. 5
FIG. 6
FIG. 7

| Host Block Address | Device Block Address | Identity characteristic | Read Count |
|---|---|---|---|
| 0, 2, 6 | 0 | 1234ABCD | 4 |
| 1 | 1 | 1A2B3C4D | 2 |
| 3, 5 | 2 | 5678EFAB | 1 |
| 4 | 3 | 5A6B7C0D | 1 |
| ... | ... | | |

| 0 | 1 | 2 | 3 | not used | not used |
|---|---|---|---|---|---|

I # SYSTEMS AND METHODS FOR PERFORMING DEDUPLICATED DATA PROCESSING ON TAPE

CROSS-REFERENCE TO RELATED APPLICATION

This application claims priority to European Patent Application No. 09176818.4, filed Nov. 24, 2009, and entitled "System And Methods To Perform Deduplicated Data Processing On Tape."

BACKGROUND

1. Field of the Invention

The present invention relates to the field of management of sequential media, and more particularly to deduplication processing of sequential media such as tapes which management is performed by a storage management application.

2. Description of the Related Art

Prior art storage management applications such as IBM Tivoli® Storage Manager, Symantec Netbackup™ or EMC® Legato perform different data storage operations such as backup, archiving and hierarchical storage management. Storage management applications use sequential media such as tape for cost efficient storage mainly for data which is access less often and which is retained for longer periods of time.

A typical example for sequential media is a tape cartridge, also called tape. A tape cannot be written in a random fashion but rather sequentially from the beginning to the end. Thus it is not possible to write data to any position on tape but only at the position where the last write operation ended. When data on a tape needs to be overwritten then the tape must be written from the beginning Thus, tapes are written sequentially.

SUMMARY OF THE INVENTION

In one embodiment, a method is provided for processing data stored on a sequential storage media within a computational computing environment. A block reference table and most often read blocks are loaded from a modified tape format of a sequential storage media into an internal memory of a sequential storage media device. During write command processing, a data deduplication procedure is performed using a modified block reference table. For each data stored at a predefined device block address, an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table. It is determined if entries from the block reference table must be deleted and responsive to this identifying and deleting host block and device block entries from the block reference table.

In another embodiment, a system is provided for processing data stored on a sequential storage media within a computing environment. The system includes a storage management application for initiating read and write operations to the sequential storage media, a sequential storage media device, at least one sequential storage media for executing read and write operations, the at least one sequential storage media comprising a modified tape format adapted for storing a block reference table and most often read blocks, and at least one processor device, operable in the computing environment. A block reference table and most often read blocks are loaded from a modified tape format of a sequential storage media into an internal memory of a sequential storage media device. During write command processing, a data deduplication procedure is performed using a modified block reference table. For each data stored at a predefined device block address an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table. It is determined if entries from the block reference table must be deleted and responsive to this identifying and deleting host block and device block entries from the block reference table.

In a further embodiment, a computer program product is provided for processing data stored on a sequential storage media within a computing environment. The computer program product includes a computer-readable storage medium having computer-readable program code portions stored therein. The computer-readable program code portions include a first executable portion, a second executable portion, and a third executable portion. The first executable portion is adapted for loading a block reference table and most often read blocks from a modified tape format of a sequential storage media into an internal memory of a sequential storage media device. The second executable portion is adapted for, during write command processing, performing a data deduplication procedure using a modified block reference table. For each data stored at a predefined device block address, an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table. The third executable portion is adapted for determining if entries from the block reference table must be deleted and responsive to this identifying and deleting host block and device block entries from the block reference table.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only embodiments of the invention and are not therefore to be considered to be limiting of its scope, the invention will be described and explained with additional specificity and detail through the use of the accompanying drawings, in which:

FIG. 3 illustrates the operation of a prior art host and device block layout in sequentially manner;

FIG. 4 illustrates the host and device block layout after data is appended at the end;

FIG. 5 illustrates the host and device block layout after data is overwritten in the middle;

FIG. 6 illustrates the tape format according to prior art;

FIG. 7 illustrates a tape format according to one embodiment of the present invention;

DETAILED DESCRIPTION OF THE DRAWINGS

Figure 1:
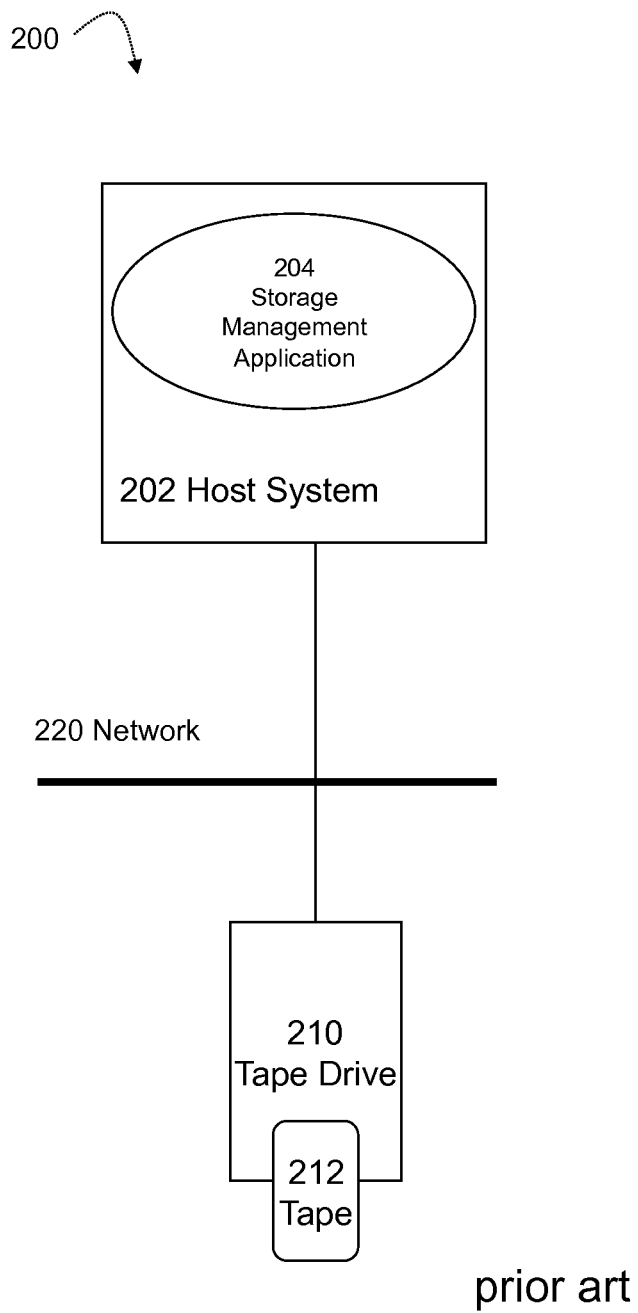
FIG. 1 shows a storage management system according to prior art.

FIG. 1 shows a storage management system 200 according to prior art. The storage management application 204 runs on a host computer system 202 which is connected via network 220 to tape drives 210. Network 220 might be a Storage Area Network (SAN) based on fibre channel or it might be a Local Area network based on Ethernet. The storage management application 204 reads and writes data—organized in host blocks addressing actual data—to tape drives via network 220. Tapes process data sequentially. Thus multiple host blocks—where each host block is denoted by a unique number (address) in ascending order—are written in sequential order according to its address. The host block numbering starts at number 0 and ends at the maximum capacity of the sequential storage medium. Host block with number 0 is written to the beginning of the tape as shown in FIG. 3 explained below. According to the example in FIG. 3 seven host blocks are written in sequence to a sequential medium.

Figure 2A:
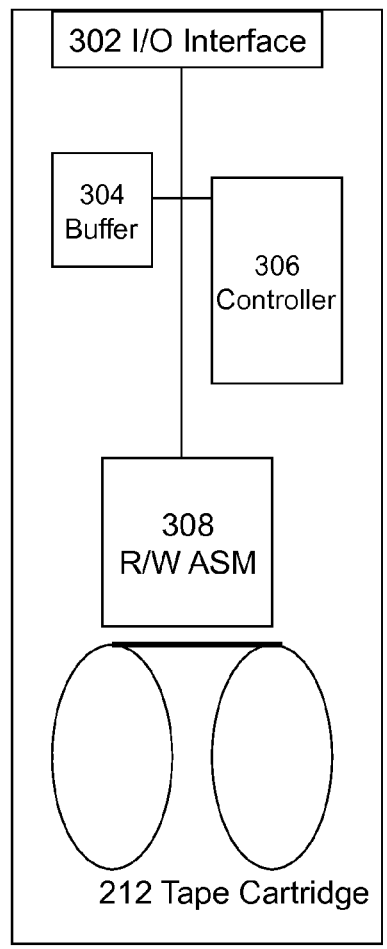
FIG. 2A shows a tape drive 210 (210a or 210b) according to prior art such as the IBM® TS1130 as a part of FIG. 1.

FIG. 2A shows a tape drive 210 according to prior art such as the IBM® TS1130. Tape drive 210 has an I/O interface 302 which is connected to network 220 (FIG. 1). Tape drive 210 obtains commands such as SCSI command sent via fibre channel (SAN) or iSCSI (LAN) from the storage management application 204 (FIG. 1). Tape drive 210 further includes a cache memory 304 which is used to buffer data read or written by the storage management application via interface 302. The IBM® TS1130 uses a 1 GB cache memory. Tape controller 306 manages all tape operations and the protocol on interface 302. The read/write assembly performs read and write operations on tape cartridge 212 which must be loaded in tape drive 210. For example when the storage management application 204 (FIG. 2) sends a write command to the tape drive 210 via network 220 (FIG. 2) the tape controller 306 instructs the storage management application to send the data to be written and than buffers the data in cache memory 304. When all data has been sent by the application or cache memory 304 is filled up, the tape controller instructs the read/write assembly 308 to write the data to tape cartridge 212. Likewise, when the storage management application sends a read command including a the number of blocks to be read, the controller 306 receives this read command and instructs the read/write assembly 308 to read the requested data from the current position into the cache memory 304 and subsequently transfers the data via the I/O interface 302 to the storage management application 204.

Next, further details of prior art tape processing are described.

FIG. 3 illustrates a prior art host and device block layout 30 designed in a sequential manner. Each host block is written to a block address on the tape medium which is the device block. There is a one-to-one mapping (1:1) of host blocks and device blocks. At the end of the last written host block there is an end-of-data mark (EOD) which is written by the tape drive.

Typically, data is appended to sequential media at the end of data mark. For example, if behind block 6 (last block in FIG. 3) two more blocks are written, then block 7 and 8 are allocated and succeeded by EOD according to FIG. 4, which illustrates the host and device block layout 40 after data is appended at the end.

Also typically, data is written from the beginning of tape denoted by block 0. When a tape, such as the tape presented in FIG. 4, is rewritten from block 0 then all subsequent data (blocks 1-8 in FIG. 4) are being overwritten.

Data in the middle of the tape, such as host block 3 (FIG. 3) cannot be overwritten unless all subsequent host blocks are overwritten as well. The host block number remains the same. For example, if from host block 3 (FIG. 3) two blocks are written then the data of block 3 and 4 are overwritten with the new data which again allocates block address 3 and 4. Blocks 5 and 6 are essentially deleted and cannot be accessed any more as shown in FIG. 5 which illustrates the host and device block layout 50 after data is overwritten in the middle.

When data is read from tape, the tape is positioned at the appropriate device block which is between block 0 and EOD by a locate or space command. Subsequently the requested blocks are read in sequence by a read command. For example if blocks 1 and 2 are to be read, the storage management application 204 sends a locate command to the tape drive 210 to position the tape at block 1. Subsequently the storage management application sends a read command instructing the tape drive 210 to read two blocks (1 and 2) and the tape drive reads blocks 1 and 2 from the tape 212 and returns it to the storage management application 204. Reading beyond end-of-data is not allowed by the tape drive. That means, when according to FIG. 3 a space or locate command instructs the tape drive to locate beyond block 6 then this command is presented an error. Thus, it is not possible to position the tape beyond the last written block.

Tape drives according to prior art create a certain format on the tape 60 which is shown in FIG. 6. The leader area is used for loading and spooling the tape, there is no data in this area.

The initialization area of the tape is used to store data which is only relevant and accessible by the tape drive and not by the host system. This data may include format identifiers and volume/drive statistics and is used for initialization of the tape during load.

Actual payload data is written to the data area from block 0 to block N. Data is transferred by a host system 202 and more particular by the storage management application 204 to the tape drive 210 via a communication link 220 such as fibre channel or Ethernet. For example, block 0 may contain host block 0 and block N may contain end-of-data.

The end-of-tape mark denotes the end of the tape, this is recognized by the drive and not read by a host.

Now, with respect to the disadvantages of prior art, if host blocks are identical they are stored on tape which may result in a waste of space and storage capacity on tape. It is noted that the storage capacity of magnetic tapes is steadily growing. While today capacities are around 1 Terabyte, vendors have proven capacities of up to 8 Terabytes in their laboratories. With the high amount of data on tape this represents a remarkable disadvantage as in prior art there is no known technology to avoid that multiple instances of the same data are written to tape.

According to one aspect of the present invention, a method for operating tapes which consumes less storage spaces on tapes may be provided. This is achieved by the features stated in enclosed independent claims. Further advantageous arrangements and embodiments of the invention are set forth in the respective subclaims. Reference should now be made to the appended claims.

According to one aspect of the present invention, a deduplication of data on tape is provided. Briefly, such data deduplication on tape identifies data blocks which are identical and stores identical data blocks only once on tape, while other instances of an identical block are just referenced to the data which has been stored using an appropriate block reference table.

More particularly, in one embodiment, the tape drive system includes a larger internal memory for storing a block reference table and most often read data blocks and an deduplication logic (software) running on the tape device controller according to prior art.

According to a first aspect of the present invention, a method and a respective system is disclosed for processing data stored on a sequential storage media within a computational computing environment. A storage management application initiates read and write operations to the sequential storage media, and a sequential storage media device with at least one sequential storage media executes read and write operations. The sequential storage media device includes a large internal memory for storing a block reference table mapping host blocks to device blocks and storing an identity-characterizing bit string and a read counter for each device block. A tape format on each tape includes a storage area where the block reference table is stored.

The method is preferably performed by deduplication logic characterized by the following steps.

a) During load processing, the block reference table is loaded into the large internal memory, preferably an existing FLASH memory of the tape drive.

b) During write command processing, a data deduplication procedure is performed using a modified block reference table. For each data stored at a predefined device block address, an identity-characterizing bit string is defined. The identity characterizing-bit string for all data transferred as part of the write command is determined. For all data transferred as part of the write command, a prior art data identity search is performed using the modified block reference table for finding identical, i.e. redundant data blocks. Identical host block data is stored under a single device block address and reference this in the block reference table.

c) During read command processing, the requested host blocks are mapped to device blocks using the block reference table. The device blocks are sorted in an ascending order. Device blocks are read from tape, and device block data read from tape is written to the internal tape buffer. The read counter is increased for all device blocks read in the block reference table.

d) During unload processing, the block reference table is written to the tape format.

Preferably, in order to save read time it is proposed to perform a modified read processing which is based on cached device block data which are most often read. Therefore, in one embodiment, the tape format is extended by a storage area where the most often read data blocks are stored. The deduplication logic is modified to perform the following steps in addition to the steps outlined above.

a) During load processing, most of read blocks are read from tape and stored in the large internal memory.

b) During read processing, it is determined which of the requested device blocks are already cached in the large internal memory as a most often read block. The remaining not-cached device blocks are sorted in an ascending order corresponding to the processing order of the sequential tape. Non-cached device blocks are read from the tape, and cached device blocks are read from the large internal memory into a write/read operation buffer just serving for rendering the write or read command independent of the actual physical operation of the tape handling. The read count is increased, and it is determined if the read count for one or more of the requested device blocks is the highest. The device block data for device blocks with the highest read count are copied to the internal memory (310) as a most often read block.

c) During unload processing, the most often read device blocks are written from the internal memory to the tape format.

Preferably, the deduplication logic is implemented by means of software and runs on a tape drive controller which essentially represents a computing system.

Preferably, the step of performing the data deduplication procedure is implemented by means of amended prior art where for each data block written by a tape-write command an identity characteristic is determined. The determination of an identity characteristic is based on cryptographical hashed such as Message Digest 5 (MD5), Secure Hash Algorithm (SHA) or Whirlpool.

Figure 2B:
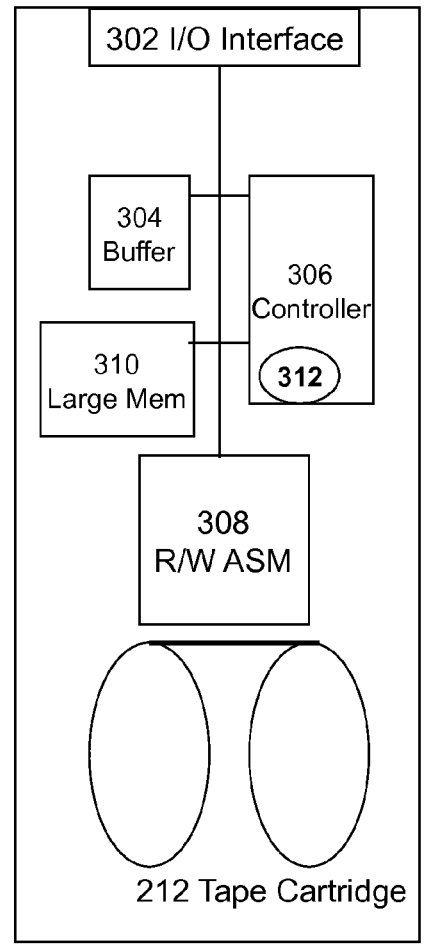
FIG. 2B illustrates the most basic structural components of a hardware and software environment of a tape drive used for a preferred embodiment of the present invention.

With general reference to the figures and with special reference now to FIG. 2B, in one embodiment, the tape controller 306 implements an additional software component 312, which comprises the essential logic for performing the tape data deduplication method, as described herein. In particularly, this is done fully transparent to the storage management application 204 in FIG. 1 issuing storage requests. A preferred way to implement this functionality is to intercept the prior art tape control commands such as SCSI tape operation commands and modifying them, i.e. adding processing logic and parameters required for the tape data deduplication to the commands by which the tape is actually controlled. More details are given further below.

The preferred embodiment comprises a tape drive system 300 and programmed methods executed by the deduplication logic 312 which performs data deduplication on a tape. The preferred system comprises: a) a large internal memory 310 which might be represented by a SSD (solid state drive), e.g. a FLASH memory, with a capacity of 1/10 of the tape total capacity and b) a tape format 70 (FIG. 7) including a storage area 72 for a block reference table and a storage area 74 for most often read blocks prior to beginning of the user area of the tape, as it reveals from FIG. 7. c) The block reference table 72 (FIG. 8) is managed by the deduplication logic 312 which maps the host blocks (column 1, blocks written by the host system) to the device blocks (column 2, blocks written to tape) together with an identity characteristic 82 (column 3) for each unique block and a read count 84 (column 4).

Figures 8, 9:
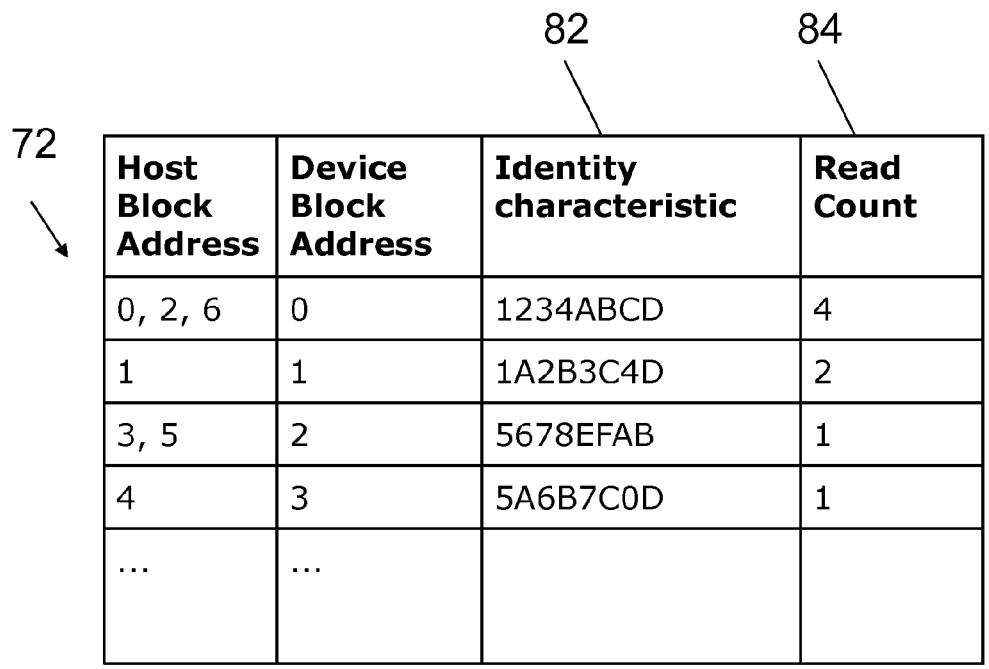
FIG. 8 illustrates a block reference table according to one embodiment of the present invention.
FIG. 9 illustrates the device block layout after deduplication.

FIG. 8 shows an example of the respective layout of the block reference table. According to FIG. 8, rows 2 and 3 of data of host blocks 0-1 are not identical and are therefore written to device block 0-1.

The data addressed by host block 2 (row 2) is identical to host block 0 and is therefore referenced to device block 0 in column 2. Host block 2 is not written to a device block, because it already exists. The data addressed by host blocks 3-4 (row 4 and 5) are not identical and are therefore written to device block 2-3.

Host block 5 is identical to host block 3 and is therefore referenced to device block 2 in row 4 and column 1. Host block 5 is not written to a device block, because it already exists. Host blocks 6 is identical with device block 0 and is therefore not written but referenced in table 1 row 2 and column 1.

According to FIG. 8 column 4 (84), device block 0 which is referenced by host block 0,2,6 has been read 4 times. Device block 1 has been read 2 times and device blocks 2 and 3 have been read 1 time. Thus device block 0 has been read most often, followed by device block 1, 2 and 3. For example, the data stored in device block 0 and 1 might be stored as most often read blocks in the large internal memory 310.

A device block layout after a tape deduplication based on the layout according to prior art (FIG. 3) is shown in FIG. 9. The table from FIG. 8 mapping host blocks to device blocks complements the device block layout of FIG. 9. Thus, the device block layout in FIG. 9 is only workable with Table 8.

The deduplication logic 312 (FIG. 2B) and a large internal memory 310 includes program logic in order to perform the following methods or procedural steps.

Generally, a logic for intercepting load processing includes reading the block reference table and the most often read blocks from the tape format 70 (FIG. 7) into the large internal memory 310 (FIG. 2B) and performing load processing according to prior art.

Figure 10:
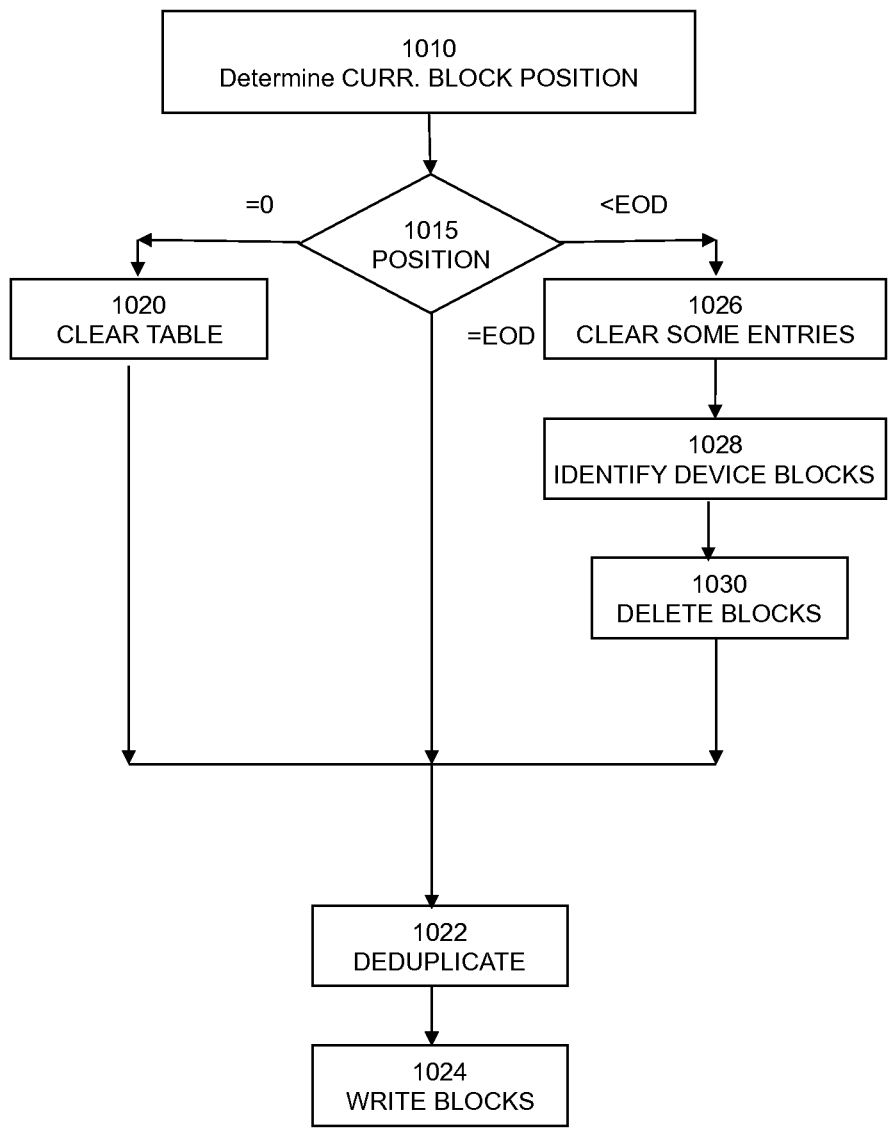
FIG. 10 illustrates the control flow of the most important steps of an embodiment of the present invention.

Next, FIG. 10 illustrates the control flow of the most important steps of a preferred embodiment of the method implementing tape data deduplication. The logic for intercepting host write commands and processes as follows.

The current block position on the tape is determined, step 1010. Then, a decision 1015 is made. If the current block position=0, then all host blocks (column 1, FIG. 8), identity characteristics 82 (column 3, FIG. 8), and most often read blocks 84 (column 4, FIG. 8) are cleared from the block reference table 72 (FIG. 8), step 1020, deduplicated, step 1022, and written, step 1024.

If in step 1015 the decision is made that 0<current block<EOD, then clear all entries (host block address (column 1, FIG. 8), identity characteristics (column 3, FIG. 8), and read counters (column 4, FIG. 8) where host block address is greater than or equal to the current host block address are cleared from block reference table 72 (see FIG. 8), step 1026. Device blocks are identified which do not have a host block assigned and which are stored as most often read block in the internal memory 310, step 1028. These device blocks are deleted from the memory 310, step 1030, deduplicated, step 1022, and written, step 1024.

If in step 1015 current block=EOD, then deduplicate, step 1022, and write blocks, step 1024.

Figure 11:
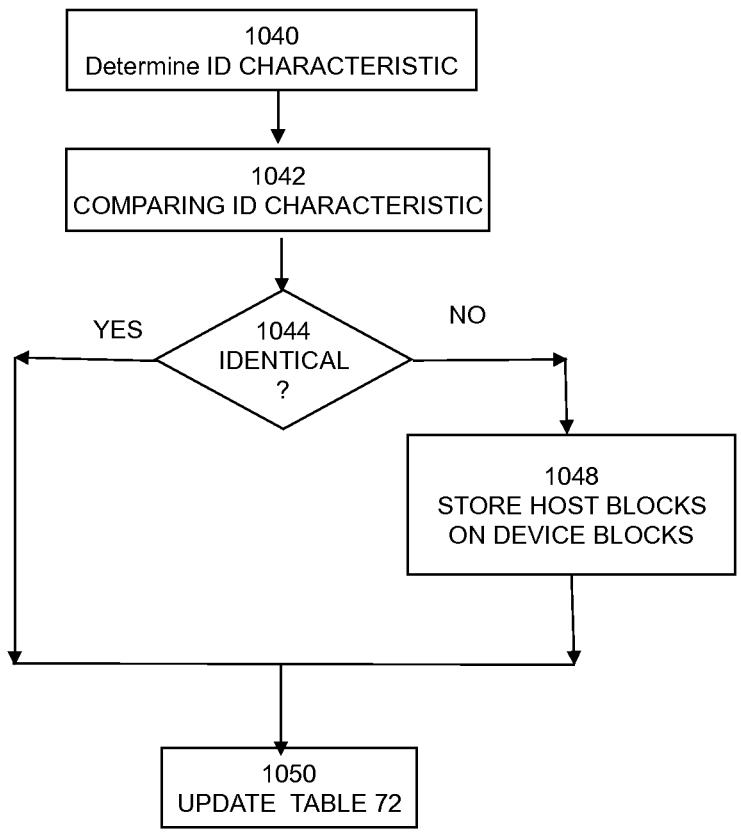
FIG. 11 illustrates the control flow of the most important steps of a preferred embodiment of the deduplication and write steps in FIG. 10.

The steps of deduplicating 1022, and writing blocks 1024, comprise preferably the following steps, which are depicted in the control flow diagram of FIG. 11.

At step 1040, an identity characteristic of the host data blocks transmitted by the write command is determined. This characteristic is a bit string of sufficient bit length which might be calculated by a crypto graphic hashing method.

At step 1042, this identity characteristic is compared to the identity characteristic of all other blocks stored in block reference table 72 in FIG. 8 at column 3.

At step (or decision) 1044, if the identity characteristic of host blocks is identical then, at step 1050, the reference table 72 (FIG. 8) column 1 is updated for the respective row by referencing the host block to the device block which is identical (has a match in column 3).

If the identity characteristic of host block is not identical, at step 1048, host block data is stored on the next device block in sequence, and at step 1050, table 72, column 1 (host block), column 2 (device block it was stored on), and column 3 (identity characteristic determined in step 1040) are updated.

The logic for intercepting host read commands and processes performed by the deduplication logic 312 (FIG. 2B) works as follows.

The current position of the tape is determined (this is the starting position for the read command, the read command requesting one or more host blocks). The list of device blocks is determined for host blocks requested to be read from the current position using block reference table 72, column 1 and 2, and for each device block of the list increase the read count and update column 4 of table 72 accordingly.

It is determined which device blocks of the list are cached in the large internal memory 310 (FIG. 2B) (most often read), i.e. the cached blocks, and the cached blocks are removed from the list of device blocks to be read from the tape.

The remaining (i.e. the non-cached blocks) device block list is sorted in an ascending order, by which a repeated start and stop motion of the tape can be avoided.

The first device block is located. The data is read in the order from device block addresses and the data is stored in the internal buffer memory. The device blocks which are in the internal memory to the buffer memory are copied to the appropriate positions. All data read is returned to the requesting system.

It should be noted that the data which is read from tape is typically buffered in prior art in a tape drive internal buffer memory 304 (FIG. 2B) until all host blocks have been read from the tape or the internal buffer memory is full. This allows management of the most often read blocks in continuation of the read command processing presented above as follows.

Device blocks with the highest read count are identified using table 72, column 4 (FIG. 8). These device blocks are copied from the internal buffer memory 304 to the large internal cache memory 310 (FIG. 2B) as a most often read block (for later references).

The logic for intercepting write filemark commands and updating the block reference table 72 works as follows.

Table 72 (column 1 and 2) is updated, and the filemark is written to the device block on tape according to prior art methods. The logic for intercepting locate/space commands and processes works as follows. The host block address given in the locate command is determined. The associated device block is determined address using table 72, column 1 and 2. The tape is located to the determined device block address according to prior art methods.

The logic for intercepting the unload commands and processes as follows, works as follows.

The tape is rewound. The block reference table 72 (FIG. 8) which resides in the large internal memory 310 is written to the block reference area of the tape format 70 (FIG. 7). The most often read blocks which reside in the large internal memory 310 are written to the tape according to the tape format (74 in FIG. 7). The tape is unloaded according to processes of prior art.

It should be noted that the most often read blocks are used to perform an optimal read processing, because device blocks which are read most often are stored at the beginning of tape and are copied to the large internal memory. If one of these blocks is read no tape positioning is required. Because the storage area for most often read blocks on tape and in the large internal cache memory is limited only a subset of device blocks can be stored here. During read processing the most often read blocks are identified based on the read count in block reference table 72 of FIG. 8. The set of most often read block is built up sequentially during the lifecycle of the tape.

As to modifications of the method described herein: The method is appropriate for removable storage devices and media in general because it focuses on deduplication of data stored on one storage medium whereby important information about the deduplicated data—such as the block reference table—is stored on the storage medium itself. Thus, the deduplication logic and methods explained can be implemented in removable optical disk storage media drives such as Digital Versatile Disc (DVD), BlueRay™ optical disk or holographical disk storage, or it can be implemented in removable disk drives.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product (having executable portions) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

While one or more embodiments of the present invention have been illustrated in detail, one of ordinary skill in the art will appreciate that modifications and adaptations to those embodiments may be made without departing from the scope of the present invention as set forth in the following claims.

What is claimed is:

1. A method for processing data stored on a sequential, non-transitory, storage media within a computational computing environment, the method comprising:
   loading a block reference table and most often read blocks from a modified tape format of a sequential storage media into an internal memory of a sequential storage media device;
   during write command processing, performing a data deduplication procedure using a modified block reference table, wherein for each data stored at a predefined device block address an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table;
   determining if entries from the block reference table must be deleted and responsive to the data identity search and deleting host block and device block entries from the block reference table;
   performing a modified read processing for reading the data of a plurality of device block addresses by using the block reference table;
   mapping host blocks to device blocks and the most often read blocks cached in the internal memory; wherein the mapping comprises:
      receiving a read command;
      determining requested host block addresses from the read command;
      mapping the host blocks to device blocks using the block reference table;
      identifying cached device blocks stored in internal cache memory;
      sorting remaining not-cached device blocks in an ascending order corresponding to a processing order of sequential tape; and
      reading cached and not-cached device blocks from the tape and from the internal memory into a write/read operation buffer;
   storing a read count for each device block in the block reference table;
   determining how often the device block data has been read;
   during read-command processing, increasing the read count for device blocks read;
   determining if the read count for one or more of a requested device block is highest;
   copying the device block data for device blocks with a highest read count to the internal memory as a most often read block; and
   writing to tape most often read blocks into a reserved area of the tape.

2. The method of claim 1, wherein the performing the data deduplication procedure comprises:
   determining an identity characteristic for each data block written by a tape-write command,
   wherein the determination of an identity characteristic is based on cryptographical hashes comprising Message Digest 5 (MD5), Secure Hash Algorithm (SHA), Whirlpool, or a combination thereof, and
   wherein the identity characteristic is stored in the block reference table on the sequential media.

3. A system for processing data stored on a sequential, non-transitory, storage media within a computing environment comprising:
   a storage management application for initiating read and write operations to the sequential storage media;
   a sequential storage media device;
   at least one sequential storage media for executing read and write operations, the at least one sequential storage media comprising a modified tape format adapted for storing a block reference table and most often read blocks; and
   at least one processor device, operable in the computing environment, wherein the processor device is adapted for:

loading a block reference table and most often read blocks from a modified tape format of a sequential storage media into an internal memory of a sequential storage media device;

during write command processing, performing a data deduplication procedure using a modified block reference table, wherein for each data stored at a predefined device block address an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table;

determining if entries from the block reference table must be deleted and responsive to the data identity search and deleting host block and device block entries from the block reference table;

performing a modified read processing for reading the data of a plurality of device block addresses by using the block reference table;

mapping host blocks to device blocks and the most often read blocks cached in the internal memory; wherein the mapping comprises:
receiving a read command;
determining requested host block addresses from the read command;
mapping the host blocks to device blocks using the block reference table;
identifying cached device blocks stored in internal cache memory;
sorting remaining not-cached device blocks in an ascending order corresponding to a processing order of sequential tape; and
reading cached and not-cached device blocks from the tape and from the internal memory into a write/read operation buffer;

storing a read count for each device block in the block reference table;

determining how often the device block data has been read;

during read-command processing increasing the read count for device blocks read;

determining if the read count for one or more of a requested device block is highest;

copying the device block data for device blocks with a highest read count to the internal memory as a most often read block; and writing to tape most often read blocks into a reserved area of the tape.

4. The system of claim 3, wherein the performing the data deduplication procedure comprises:
determining an identity characteristic for each data block written by a tape-write command,
wherein the determination of an identity characteristic is based on cryptographical hashes comprising Message Digest 5 (MD5), Secure Hash Algorithm (SHA), Whirlpool, or a combination thereof, and
wherein the identity characteristic is stored in the block reference table on the sequential media.

5. A computer program product for processing data stored on a sequential storage media within a computing environment, the computer program product comprising a non-transitory computer-readable storage medium having computer-readable program code portions stored therein, the computer-readable program code portions comprising:

a first executable portion for loading a block reference table and most often read blocks from a modified tape format of a sequential storage media into an internal memory of a sequential storage media device;

a second executable portion for, during write command processing, performing a data deduplication procedure using a modified block reference table, wherein for each data stored at a predefined device block address an identity-characterizing bit string is defined, the identity-characterizing bit string is determined for all data transferred as part of the write command, a data identity search for the identity-characterizing bit string of the transferred data is performed using the modified block reference table for finding identical data blocks, and identical host block data are stored under a single device block address and referenced in the block reference table;

a third executable portion for determining if entries from the block reference table must be deleted and responsive to the data identity search and deleting host block and device block entries from the block reference table;

a fourth executable portion for performing a modified read processing for reading the data of a plurality of device block addresses by using the block reference table;

a fifth executable portion for mapping host blocks to device blocks and the most often read blocks cached in the internal memory; wherein the mapping comprises:
receiving a read command;
determining requested host block addresses from the read command;
mapping the host blocks to device blocks using the block reference table;
identifying cached device blocks stored in internal cache memory;
sorting remaining not-cached device blocks in an ascending order corresponding to a processing order of sequential tape; and
reading cached and not-cached device blocks from the tape and from the internal memory into a write/read operation buffer;

a sixth executable portion for storing a read count for each device block in the block reference table;

a seventh executable portion for determining how often the device block data has been read;

an eighth executable portion for during read-command processing, increasing the read count for device blocks read;

a ninth executable portion for determining if the read count for one or more of a requested device block is highest;

a tenth executable portion for copying the device block data for device blocks with a highest read count to the internal memory as a most often read block; and an eleventh executable portion for writing to tape most often read blocks into a reserved area of the tape.

6. The computer program product of claim 5, wherein the performing the data deduplication procedure comprises:
determining an identity characteristic for each data block written by a tape-write command,
wherein the determination of an identity characteristic is based on cryptographical hashes comprising Message Digest 5 (MD5), Secure Hash Algorithm (SHA), Whirlpool, or a combination thereof, and wherein the identity characteristic is stored in the block reference table on the sequential media.

* * * * *